United States Patent [19]

Smowton

[11] Patent Number: 4,961,554
[45] Date of Patent: Oct. 9, 1990

[54] FASTENER

[75] Inventor: Mark Smowton, Chelmsford, United Kingdom

[73] Assignee: Ford Motor Company, Dearborn, Mich.

[21] Appl. No.: 211,605

[22] Filed: Jun. 27, 1988

[30] Foreign Application Priority Data

Jul. 18, 1987 [GB] United Kingdom ............... 8717012

[51] Int. Cl.⁵ ............................................. F16L 3/22
[52] U.S. Cl. .................................... 248/68.1; 248/71; 248/74.1
[58] Field of Search ............... 248/74.1, 68.1, 74.2, 248/71; 24/457, 487

[56] References Cited

U.S. PATENT DOCUMENTS

| 3,458,163 | 7/1969 | Egerton | 248/68.1 X |
| 3,995,795 | 12/1976 | Hogan | 248/68.1 |
| 4,516,296 | 5/1985 | Sherman | 248/74.1 X |
| 4,705,243 | 11/1987 | Hartmann et al. | 248/74.1 X |
| 4,715,571 | 12/1987 | Soltow et al. | 248/74.2 X |

FOREIGN PATENT DOCUMENTS

| 3340537 | 5/1985 | Fed. Rep. of Germany | 248/74.1 |
| 566393 | 12/1944 | United Kingdom | . |
| 1555036 | 11/1979 | United Kingdom | . |
| 1601824 | 11/1981 | United Kingdom | 248/74.2 |
| 2080676 | 2/1982 | United Kingdom | 248/74.1 |

Primary Examiner—Alvin C. Chin-Shue
Attorney, Agent, or Firm—Peter D. McDermott; Roger L. May

[57] ABSTRACT

A fastener for bundling together a group of tubes has a first member having a cylindrical periphery and a plurality of tube-receiving recesses to hold the tubes in their correct relative positions. A second member extends circumferentially around the first member and provides a radially inward opening recess to rotatably receive the cylindrical periphery of the first member. The second member also provides means for mounting the fastener on a structure. The second member has a limited amount of axial freedom relative to the first member.

8 Claims, 2 Drawing Sheets

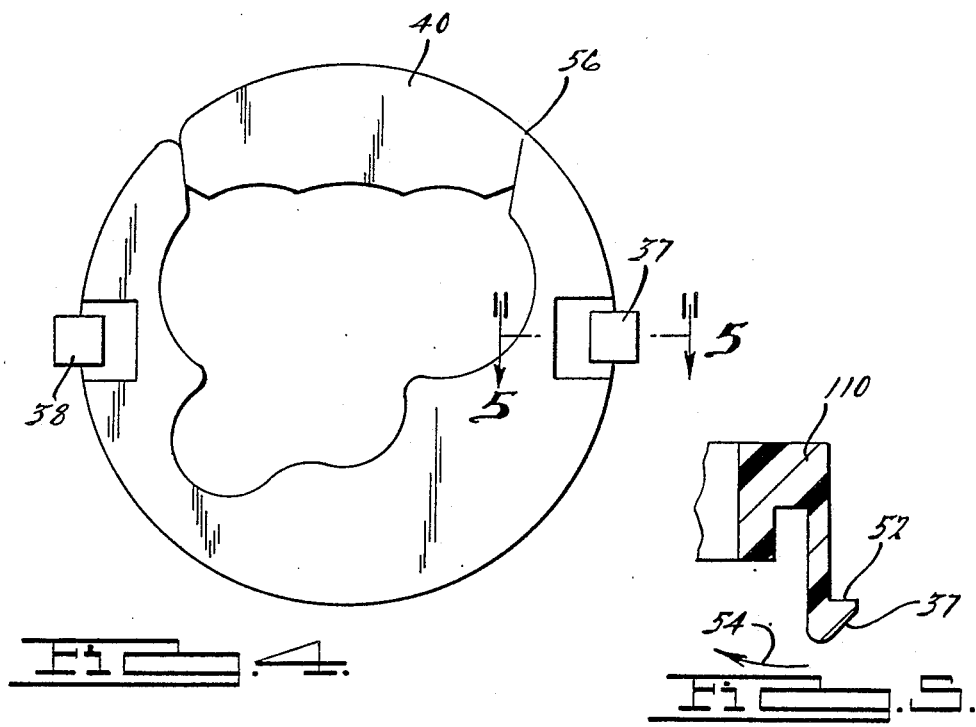
FIG. 4.
FIG. 5.
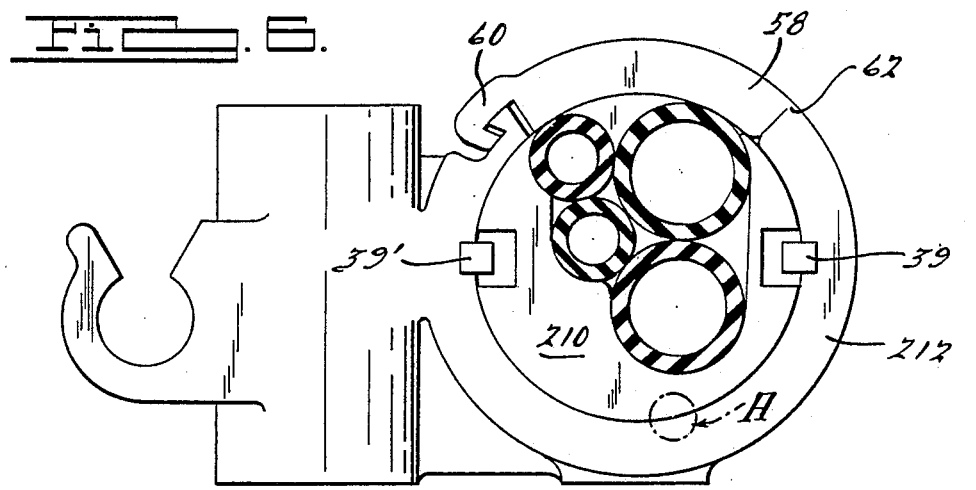
FIG. 6.
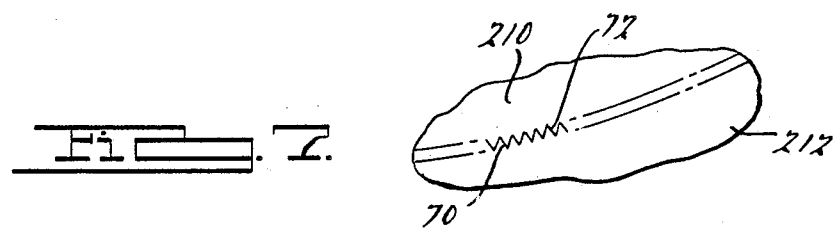
FIG. 7.

FASTENER

INTRODUCTION

This invention relates to a fastener for securing together a number of elongate members such as pipes, tubes or cables into one bundle, and then securing this bundle to a structure.

BACKGROUND

Particularly where a number of tubes are to be bundled together and then bent as a bundle to follow a specific contour (so called bundle bending), it is important that the pipes be firmly secured to one another. Subsequently, for serviceability of the pipes in the bundle, it must be possible for individual tubes or pipes to be removed from or replaced within the bundle.

SUMMARY OF THE INVENTION

Accordingly to the present invention there is provided a fastener for securing together a group of elongate members and for attaching the group to a fixed structure, the fastener comprising a first body having a cylindrical circumference, a plurality of bores parallel to the cylinder axis and adapted to accommodate the elongate members, each one of the bores being connected to, i.e. accessible from, the circumference through an access passage, a second body having a cylindrical recess and a supporting member by which the second body is attached to the fixed structure, the cylindrical recess being adapted to rotatably receive the first body.

With this construction, the individual elongate members can be held in fixed position relative to one another in the first body, and the first body can be held by the second body in the correct position in relation to the structure.

Each of the bores in the first body preferably is shaped to provide a form-fitting recess for a corresponding one of the elongate members in order that the elongate members be held accurately in the correct relative positions. The bores can be arranged so that the elongate members snap into their final positions.

The first body preferably has a limited degree of axial freedom of movement and complete rotational freedom of movement relative to the second body. This makes it easier to align the supporting member on the second body with a particular point on the fixed structure. There may also be a ratchet engagement between teeth on the first and second bodies to provide click-stop rotational location between the two parts, while allowing unimpeded relative axial movement.

The axial movement between the two bodies may be limited by moulding deflectable ears on the first body, or by moulding ears on one side of the body and a continuous lip on the other side. Such a lip can have a strengthening function on the first body. Preferably, the first body can be removed from the second body in an axial direction, after releasing a retaining catch.

The recess in the second body either is open at one portion around its circumference, or has a gate which can be opened to allow one of the elongate members to be radially withdrawn.

Both the first and second bodies are preferably made from plastic material, preferably injected moulded, according to methods and techniques well known to those skilled in the art.

The supporting member which forms part of the second body can be, for example, a socket adapted to be fitted to a so called fir tree stud on the fixed structure.

The elongate members may be metal tubes or pipes for conducting the fuel and brake fluid in a motor vehicle, and the fixed structure can be the underbody of a motor vehicle.

BRIEF DESCRIPTION OF THE DRAWINGS

The invention will now be further described by way of example, with reference to the accompanying drawings, in which:

FIG. 4 is a detail view of the first body of the fastener of FIG. 2;

FIG. 5 is a detailed section on line V—V of FIG. 4;

FIG. 6 is an elevation view of a fastener according to a the embodiment of the invention; and FIG. 7 a detail of area A of FIG. 6, showing the interface between the first and second bodies of the fastener.

DETAILED DESCRIPTION OF PREFERRED EMBODIMENTS

Figure 1:
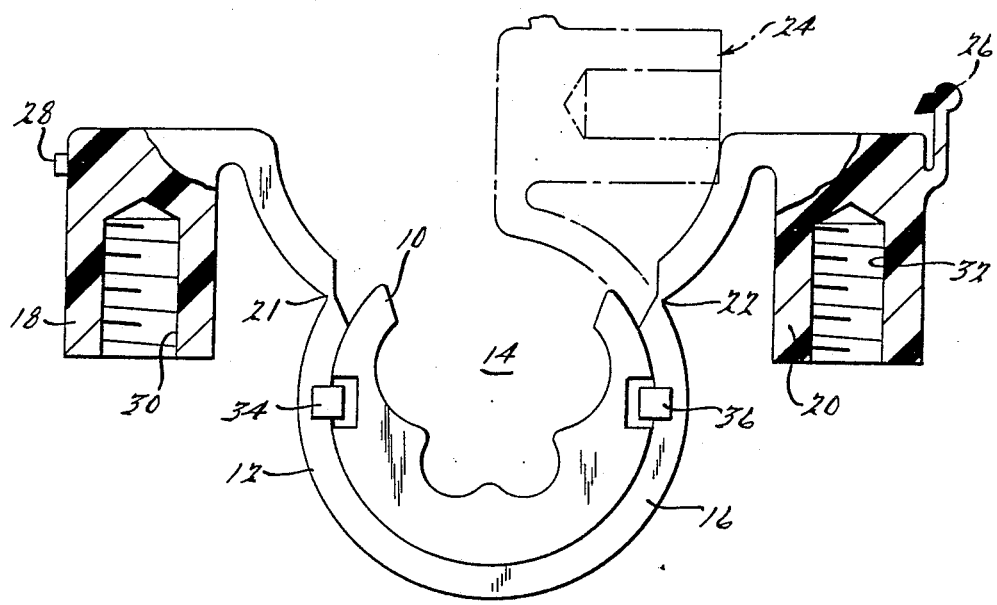
FIG. 1 is an elevation view of a fastener according to a first embodiment of the invention.

FIG. 1 shows a fastener with a first body 10 and a second body 12. The first body is a disc-like plastics moulding with a cut-out region 14 which provides recesses for four tubular pipes. The position of the center of each pipe is marked by a cross in FIG. 1. From the geometry of the recess 14, it will be seen that when all four pipes are present in the recess, they will be retained there by contact with the walls of the recess and with each other.

The body 10 is received in an annulus 16 of the second body 12, and this annulus can be opened (the open position being shown in FIG. 1) to allow pipes to be removed from within its center. The body has three distinct regions, one being the annulus 16 and the other two being cooperating wings 18 and 20 which form a supporting member and are joined to the annulus 16 by plastic hinges at 21 and 22, respectively. The "closed" position of the wing 20 is shown in dotted lines at 24, and the other wing 18 can take up a similar position. When the two wings are in their closed positions, they are locked by a snap locking feature consisting of arm 26 and detent 28. Each wing 18, 20 has a recess 30, 32, respectively, for receiving a fir-tree stud (not shown) on a fixed structure, such as a motor vehicle body. Typically, only one of the recesses 30, 32 would be in use at any one time, but the provision of the two recesses allows the fastener to be secured at either side.

It will be seen from FIG. 1 that the first body 10 has a pair of diametrically opposite retaining clips 34, 36 and these will be described in more detail in connection with the second embodiment of the invention shown in FIGS. 2, 3, 4 and 5.

Figure 2:
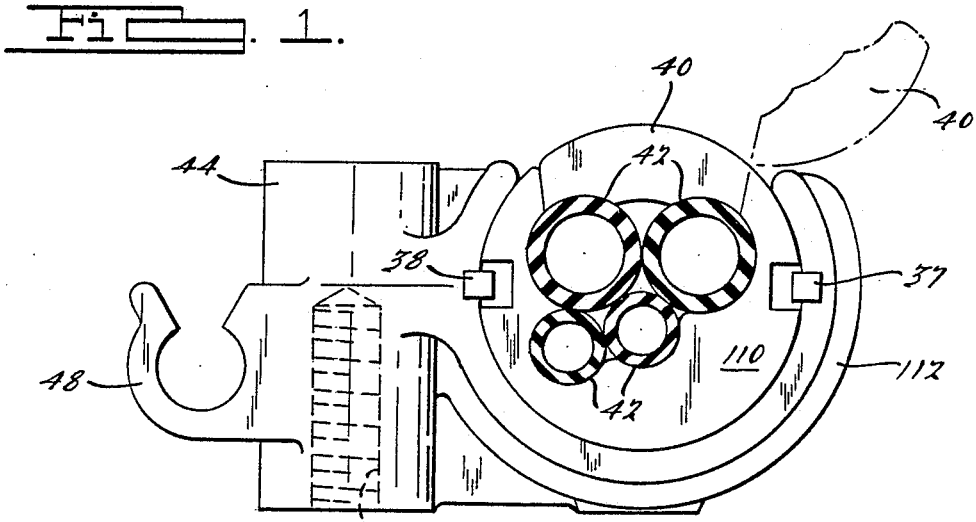
FIG. 2 is an elevation view of a second embodiment.
Figure 3:
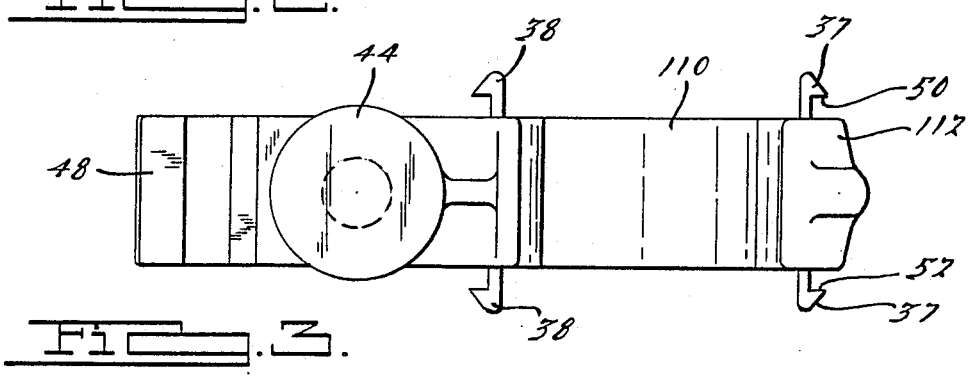
FIG. 3 is a top plan view of the fastener of FIG. 2.

In FIG. 2 the second body 112 does not form a complete circle around the first body 110, and the first body has a gate 40 which can be opened (shown in phantom) and closed to allow the tubes 42 to be inserted into or removed from the body. In this construction, the supporting member 44 is a single component as opposed to the two wings 18 and 20 of FIG. 1. The supporting member 44 has a socket 46 for receiving a fir-tree stud in the same way as in the previous embodiment. Also shown is an additional receiving clip 48 for a separately mounted pipe. As can be seen from FIGS. 3, 4 and 5, the retaining clips 37, 38 are part of the first body 110 and each extends axially, both fore and aft, beyond the surfaces of the body. The spacing between the two opposing parallel faces 50 and 52 of clip 37 (and the corresponding distance for clip 38) is greater than the axial length of the second body 112, so that a limited degree of axial movement of the body 110 in the body 112 is permitted. Movement beyond this limited degree is prevented when one of the surfaces 50 or 52 (and/or the corresponding surface of clip 38) comes into contact with the corresponding side face of the body 112.

However, because the clips are formed at the end of relatively unsupported arms (see FIG. 5), they are flexible and it is possible for them to be bent back as indicated by arrow 54 in FIG. 5, so that the body 110 can be axially separated from the body 112. This may be necessary in order to allow a particular pipe or pipes to be removed from the body 110, for servicing or replacement.

In FIG. 4, the gate 40 of the body 110 is connected to the main portion of body 110 through a unitary plastic hinge 56.

In the embodiment shown in FIG. 6, the second body 212 has a closable gate 58 with a snap-locking catch arrangement 60. Alternative catch forms are possible, and one alternative would be to place the catch at the hinge end of the gate 58, so that a detent (or recess) engages with a recess (or detent) on the second body. The first body 210 is held in the second body in essentially the same manner as described above in connection with the embodiments of FIGS. 1-5. It can be slid axially out of the second body 212 by manipulating the retaining clips 39, 39'. Once the first body 210 is out of the surrounding second body 212, individual pipes or tubes positioned within the first body can be separated. However, to remove a separated pipe from the system entirely it is also necessary to open the gate 58. This gate is connected to the rest of the second body 212 by a unitary plastic hinge 62.

Regarding the advantages of the invention, generally, it should be recognized that because of the circular shape of the first body and its retention in a circular recess in the second body, the orientation of the supporting member can be set at an infinite number of angular positions relative to the orientation of the tube bundle. FIG. 7 shows a detail of an optional embodiment of the interface of the adjacent faces of the first and second bodies. Both faces are given a toothed form 70, 72. The teeth are of a shallow height so that they provide some resistance to rotation of the first body in the second, but do not prevent such turning. The bodies can then be aligned with one another by turning them a predetermined number of "clicks" in one direction or the other. The teeth lie parallel to the axis of the fastener, so that they do not impede axial sliding of the bodies within the limits to which this movement is subject. In this way, it is not necessary to orient the supporting member at the time when the tubes are bundled together; the orientation can be done in a separate, possibly later stage.

According to preferred embodiments of the invention, each of the bores preferably provides a snap fit with the corresponding pipe, tube or other elongate member. That is, each bore preferably is so sized and shaped that positioning the corresponding tube requires overcoming some initial resistance, after which the tube snaps into place. This can be accomplished, for example, by giving the individual bores a periphery which defines somewhat more than one half (i.e., more than 180°) of a form-fitting recess (e.g., a circle for the corresponding tube).

I claim:

1. A fastener for securing together a plurality of elongate members and for attaching said plurality to a structure, the fastener comprising:
   (a) a first body having (i) a cylindrical circumference, (ii) a plurality of bores extending through said first body and adapted to accommodate said elongate members, the longitudinal axis of each of said bores being orthogonal to said cylindrical circumference of said first body, each one of said bores being accessible from the circumference through an access passage, and (iii) at least one retaining clip extending axially from said first body parallel to the longitudinal axis of said bores, said at least one retaining clip adapted to provide a limited degree of axial movement of said first body;
   (b) a second body having (i) a cylindrical recess and (ii) a supporting member by which the second body is attachable to said structure, said first body being rotatably received in said cylindrical recess of said second body; and
   (c) a gate at said access passage which can be opened while said first body is in said cylindrical recess of said second body to allow radial ingress and egress of said elongate members to and from said bores.

2. A fastener as claimed in claim 1, wherein each of said bores of said first body is shaped to provide a form-fitting recess for a corresponding one of said elongate members.

3. A fastener as claimed in claim 2, wherein at least one of said bores has a snap fit with a corresponding one of said elongate members.

4. A fastener as claimed in claim 1, wherein the cylindrical circumference of the first body and the cylindrical recess of the second body have a ratchet connection comprising mutually engaging, axially parallel teeth.

5. A fastener as claimed in claim 1, wherein the recess of the second body is open at one portion of its circumference, providing radial ingress and egress for said elongate members to and from said bores.

6. A fastener as claimed in claim 1, wherein both the first and second bodies are injection moulded of plastic material.

7. A fastener as claimed in claim 1, wherein the supporting member comprises a socket adapted to receive a fir-tree stud.

8. A fastener as claimed in claim 1, wherein said at least one retaining clip is adapted to releasably engage said second body so that said first body can be axially removed from said second body upon releasing said at least one clip.

* * * * *